(12) United States Patent
Hara et al.

(10) Patent No.: US 6,999,062 B2
(45) Date of Patent: Feb. 14, 2006

(54) DUAL ELECTRO-LUMINANCE BACK LIGHT REMOTE COMMANDER AND METHOD

(75) Inventors: Hiroshi Hara, San Diego, CA (US); Toshikazu Ido, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 618 days.

(21) Appl. No.: 10/164,853

(22) Filed: Jun. 6, 2002

(65) Prior Publication Data

US 2003/0067443 A1 Apr. 10, 2003

Related U.S. Application Data

(60) Provisional application No. 60/328,289, filed on Oct. 9, 2001.

(51) Int. Cl.
*G09G 5/08* (2006.01)

(52) U.S. Cl. ...................................... 345/158; 345/168
(58) Field of Classification Search ........ 345/156–170, 345/184, 211–213; 455/550; 340/20, 21
See application file for complete search history.

(56) References Cited

U.S. PATENT DOCUMENTS

| | | | | |
|---|---|---|---|---|
| 5,436,625 A | * | 7/1995 | Kubo | 341/22 |
| 5,831,555 A | * | 11/1998 | Yu et al. | 345/169 |
| 6,094,156 A | * | 7/2000 | Henty | 341/176 |
| 6,107,988 A | * | 8/2000 | Phillipps | 345/156 |
| 6,161,944 A | * | 12/2000 | Leman | 362/276 |
| 6,356,442 B1 | * | 3/2002 | Lunsford | 345/179 |
| 6,498,600 B1 | * | 12/2002 | Vance et al. | 345/170 |
| 6,549,789 B1 | * | 4/2003 | Kfoury | 455/550.1 |
| 6,561,668 B1 | * | 5/2003 | Katayama et al. | 362/85 |
| 2002/0186206 A1 | * | 12/2002 | Lee et al. | 345/168 |

FOREIGN PATENT DOCUMENTS

JP 408022353 A * 1/1996

* cited by examiner

*Primary Examiner*—Amare Mengistu
(74) *Attorney, Agent, or Firm*—John L. Rogitz

(57) ABSTRACT

A remote commander and methods for activating a user interface of a remote commander and for providing efficient power consumption are provided which prevent the resulting increase in use and complexity of the user interface, the subsequent decrease in operational battery life, and the added decrease in operational battery life related to the utilization of a back-light function. In one embodiment, the remote commander includes at least one user interface attached to at least one hinge means and at least one microprocessor in electrical communication with the user interface. The microprocessor is configured to activate the user interface which is currently addressable to a user. In another embodiment, the method for activating a user interface of a remote commander includes providing a plurality of user interfaces, with each of the user interfaces electrically connected to a connector, and activating the user interface that is currently addressable to the user. While in a further embodiment, the method for providing efficient power consumption by activating at least one user interface of a remote commander includes providing an electrical connection from at least one connector to each user interface, enabling movement of the user interface, and providing efficient power consumption by activating only an active user interface.

20 Claims, 3 Drawing Sheets

DUAL ELECTRO-LUMINANCE BACK LIGHT REMOTE COMMANDER AND METHOD

RELATED APPLICATIONS

This application claims priority to Provisional Application Ser. No. 60/328,289, filed Oct. 9, 2001, by Hara, et al., entitled DUAL EL BACK LIGHT SYSTEM AND METHOD, and incorporates such herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

I. Field of the Invention

This invention relates generally to the field of portable devices. More particularly, this invention relates to a remote commander and methods of activating a user interface.

II. Background of the Invention

Modern entertainment, which includes programming via television, satellite, cable, DVDs, CDs, etc., is extremely popular. This entertainment reaches billions of people all around the world every day, with the average person spending several hours each day watching television or utilizing a component or a peripheral device of an audio/video (AV) system. A typical home AV system includes a number of components and peripheral devices, such as, an AV amplifier, a DVD/CD player, speakers, a television, a VCR, and the like. Each of these components are connected to each other via a set of wires, with one component usually being central to the home AV system. This is usually the AV amplifier, or a receiver. The AV amplifier has a number of specific inputs for coupling the other components and peripheral devices. The coupling of the other components and peripheral devices is typically accomplished through the use of Sony Philips Digital Interface Format (SPDIF) connectors, with the AV amplifier having a corresponding number of control buttons or control switches which provide a limited degree of controllability and interoperability for the coupled components and peripheral devices. A user controls the home AV system by manipulating the buttons or switches on the AV amplifier, or alternatively, manipulating buttons on a hand-held remote control unit.

Watching television and operating a peripheral device is made easier and more enjoyable by the use of a remote commander unit which allows a viewer to activate components, change stations or channels, adjust the volume, and/or control other features of the components of the home AV system from a distance. Typically this is performed through a user interface of the remote commander unit, while the remote commander unit send infra-red and/or radio frequency signals to a receiver in the components, to perform the desired operation. The receiver decodes the signals and implements the instructions conveyed by the remote commander signals.

Due to the increased functionality of remote commander units, there is a resulting increase in the use and complexity of the user interface. This resulting increase in the use and complexity of the user interface causes a subsequent decrease in operational battery life of the remote commander units. Also, if the remote commander unit utilizes a back-light function, this adds to the subsequent decrease in the operational battery life of the remote commander unit.

SUMMARY OF THE INVENTION

In view of the foregoing, a remote commander and methods for activating a user interface of a remote commander and for providing efficient power consumption are provided that solve the resulting increase in use and complexity of the user interface, the subsequent decrease in operational battery life, and the added decrease in operational battery life related to the utilization of a back-light function, as mentioned above.

In particular, and in one embodiment, the remote commander includes at least one user interface attached to at least one hinge means and at least one microprocessor in electrical communication with the user interface. The microprocessor is configured to activate the user interface which is currently addressable to a user.

In another embodiment, the method for activating a user interface of a remote commander includes providing a plurality of user interfaces, with each of the user interfaces electrically connected to a connector, and activating the user interface that is currently addressable to a user. While in a further embodiment, the method for providing efficient power consumption by activating at least one user interface of a remote commander includes providing an electrical connection from at least one connector to each user interface, enabling movement of the user interface, and providing efficient power consumption by activating an active user interface.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawings.

BRIEF DESCRIPTION OF THE DRAWING

The following detailed description, given by way of example, and not intended to limit the present invention solely thereto, will best be understood in conjunction with the accompanying drawings in which.

DETAILED DESCRIPTION OF THE INVENTION

While the present invention has been particularly shown and described with reference to the embodiment(s), it will be understood that various changes and modifications may be made without departing from the spirit and scope of this invention. It is intended that the appended claims be interpreted to cover the embodiments described herein and all equivalents thereto.

Figure 1:
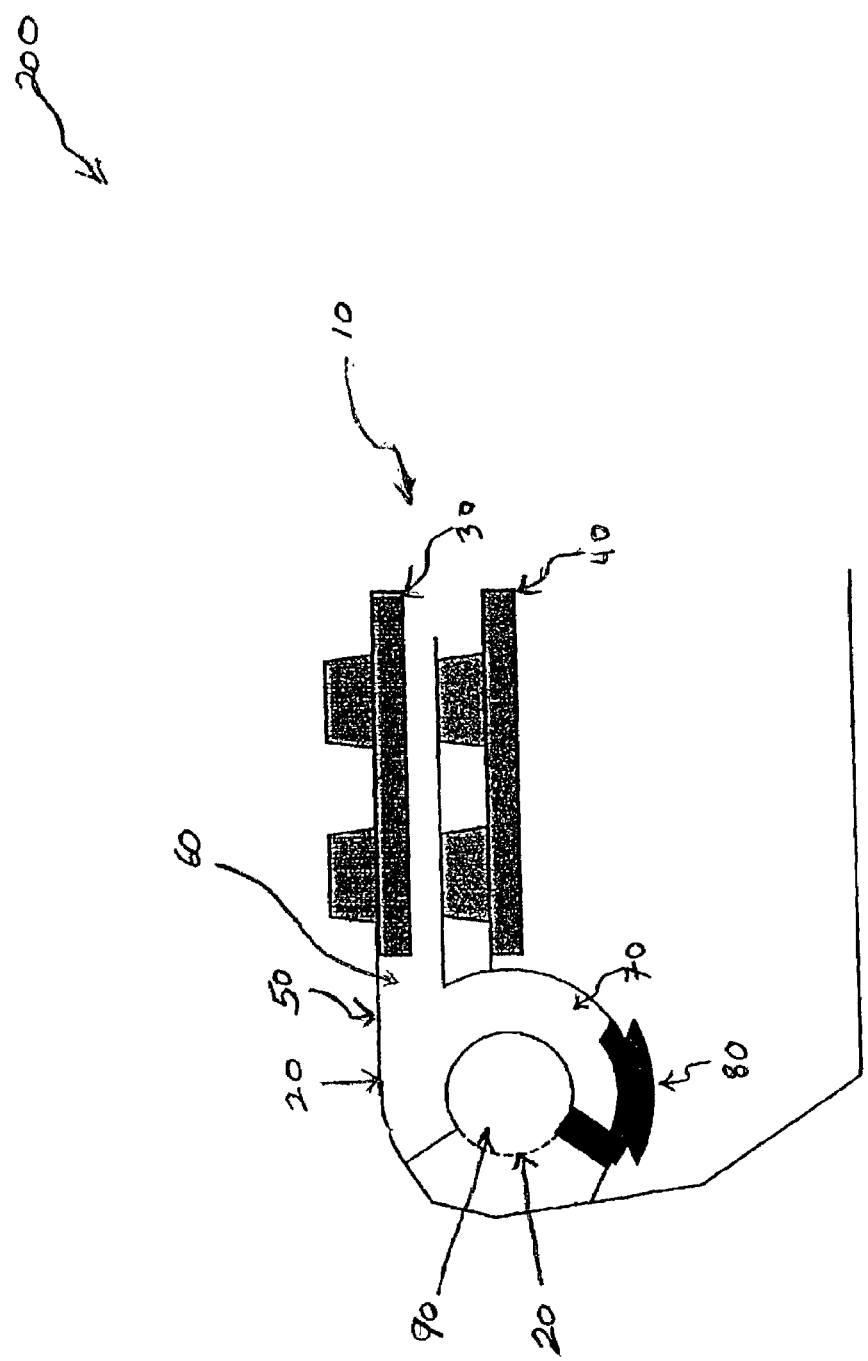
FIG. 1 illustrates one embodiment of a remote commander in a closed position.

FIG. 1 illustrates one embodiment of a remote commander 200 that includes at least one user interface 10 attached to at least one hinge means 20. User interface 10 includes a first user interface 30 and a second user interface 40. Remote commander 200 also includes at least one microprocessor (not shown) in electrical communication with first user interface 30 and second user interface 40. The microprocessor is configured to activate either first user interface 30 or second user interface 40, depending on which user interface 10 is currently addressable to a user (not shown). Hinge means 20 includes a rotatable element 50 that includes a straight segment 60 extending from a connection segment 70. First user interface 30 is attached to straight segment 60 of rotatable element 50. Remote commander 200 includes at least one connector 80 that is in electrical communication with first user interface 10 and the microprocessor, with connector 80 configured to determine which user interface 10 is addressable to the user.

In operation, any user interface 10 of remote commander 200 is activated by initially providing a plurality of user interfaces 10, with each user interface 10 electrically connected to a connector 80, and activating any user interface 10 which is currently addressable to the user. User interface 10 are connected along a common edge 90. Hinge means 20 also includes common edge 90. Rotatable element 50 is connected to remote commander 200 by attaching connection segment 70 to common edge 90.

Activation of any user interface 10 that is currently addressable to the user initially comprises activating control of user interface 10. The activation of control allows the user to fully utilize the functions of user interface 10 and operate the corresponding components (not shown). Activation of any user interface 10 that is currently addressable to the user further includes activating the illumination of that user interface 10 that is currently addressable to the user. The activation of illumination of user interface 10 is initially performed by depressing a button (not shown) on remote commander 200.

Once the button for illumination is depressed, any user interface 10 that is currently addressable to the user, and is activated for control, is also illuminated. The activation of control and illumination of any user interface 10 includes utilizing connector 80 for each user interface 10 to activate user interface 10 that is currently addressable to the user. Further, the utilization of connector 80 for each user interface 10 to activate user interface 10 that is currently addressable to the user further includes utilizing the microprocessor to determine a user interface position by connector 80.

Figure 2:
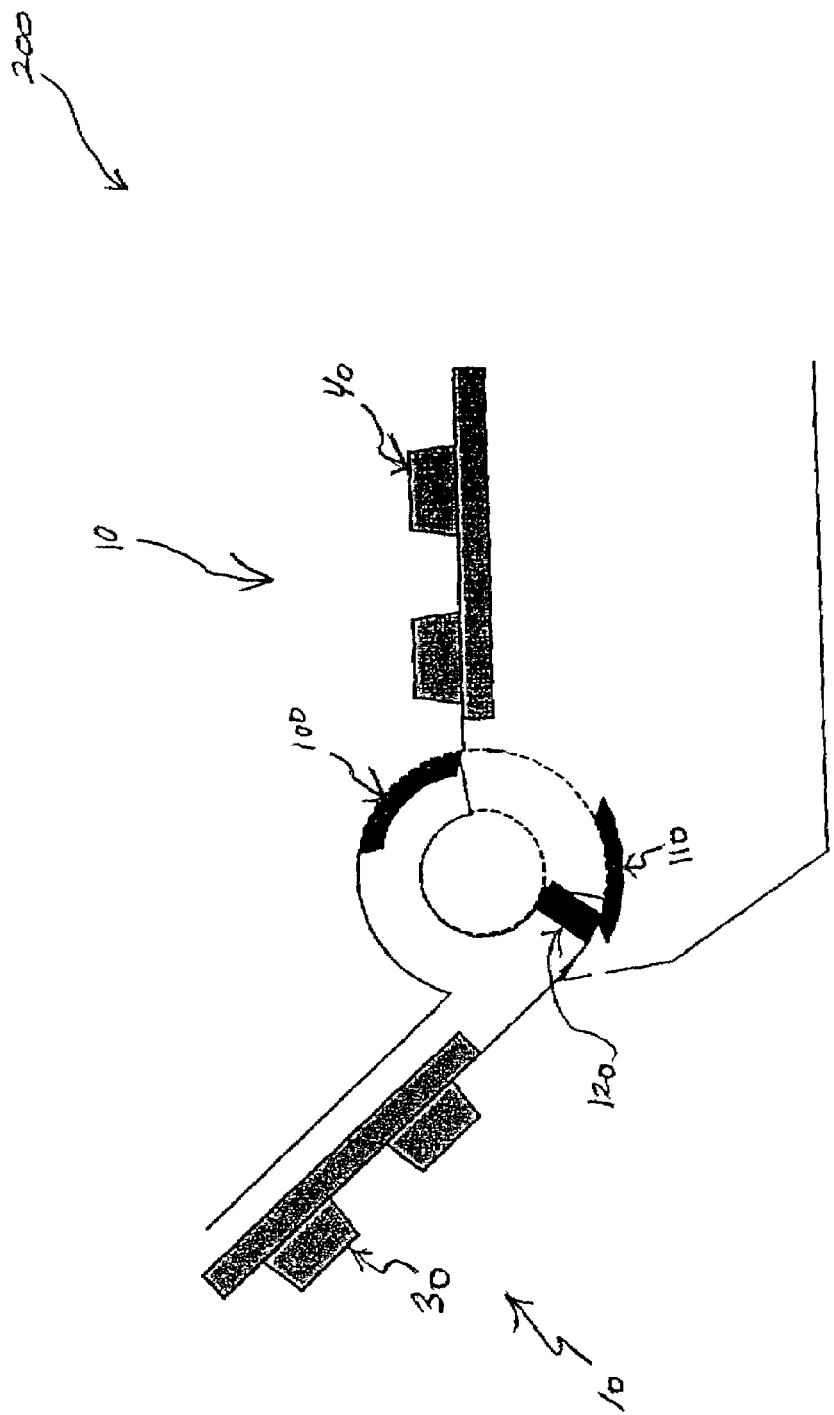
FIG. 2 illustrates the remote commander shown in FIG. 1 in an open position.

FIG. 2 illustrates remote commander 200 in an open position. Connector 80 further includes a first connector 100 and a second connector 110. First user interface 30 is in electrical communication with first connector 100 and second user interface 40 is in electrical communication with second connector 110. Remote commander 200 further includes a hinge stopper 120 that is connected to hinge means 20.

In operation, hinge stopper 120 stops rotation of first user interface 30 when connection segment 70 comes in contact with hinge stopper 120. Again, the activation of control and illumination of any user interface 10 is, in one embodiment, accomplished by utilization of first connector 100 and second connector 110 and the microprocessor which determines a user interface 10 that is currently addressable to the user by the user interface position of first connector 100 in relationship to second connector 110. In a further embodiment, when first connector 100 is in contact with second connector 110, activation of control and illumination is provided to first user interface 30. However, when first connector 100 is not in contact with second connector 110, activation of control and illumination is provided to second user interface 40.

Figure 3:
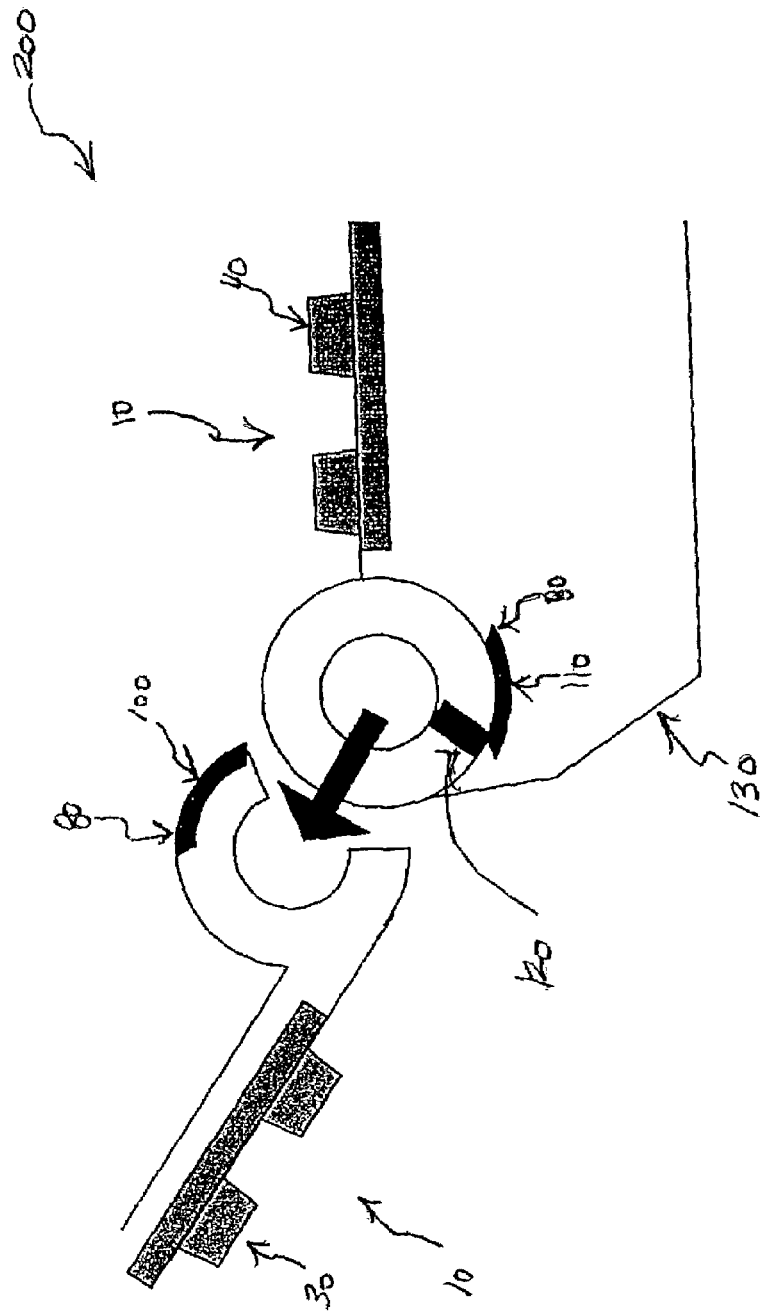
FIG. 3 illustrates a detachment of a user interface and a connector from the remote commander shown in FIGS. 1 and 2.

FIG. 3 illustrates, in one embodiment, a detachment of first user interface 30 and a first connector 100 from a main body 130 of remote commander 200. First user interface 30 and first connector 100 are removably connected to second user interface 40 and second connector 110. In another embodiment, hinge stopper 120 becomes a supporting point for remote commander 200 and a continuous rotating force on first user interface 30 will cause first user interface 30 to detach from common edge 90.

In operation, efficient power consumption is achieved by activating at least one user interface 10 of remote commander 200 at a time. The method for providing efficient power consumption further includes providing electrical connection from at least one connector 80 to each user interface 10, enabling movement of user interface 10, and providing efficient power consumption by activating only an active user interface. Enabling movement of the user interface includes enabling horizontal movement, vertical movement, rotational movement, and detachment of any user interface 10. Providing efficient power consumption by activating only an active user interface includes utilizing connector 80 to determine the active user interface, and provide power to only the active user interface. In one embodiment, utilizing connector 80 to determine the active user interface includes defining second connector 110, or any connector 80, that is connected with main body 130 as an active connector.

The method for providing efficient power consumption by activating at least one user interface 10 of remote commander 200 further includes providing at least one microprocessor (not shown) in a device, remote commander 200, and utilizing the microprocessor and the active connector to determine the active user interface. Utilizing the microprocessor and the active connector to determine the active user interface includes providing electrical communication between the microprocessor and the active connector of the active user interface.

In another embodiment, the method for providing efficient power consumption by activating at least one user interface 10 of remote commander 200 when utilizing the microprocessor and the active connector to determine the active user interface further includes discontinuing electrical communication between the microprocessor and connector 80 of a non-active user interface.

Various other modifications and alterations in the structure and method of operation of this invention will be apparent to those skilled in the art, without departing from the scope and spirit of the invention. Although the invention has been described in connection with specified preferred embodiments, it should be understood that the invention as claimed should not be unduly limited to such specific embodiments. It is intended that the following claims describe the scope of the present invention and that the structures and methods within the scope of these claims and their equivalents be covered thereby.

We claim:

1. A method for activating a user interface of a remote commander, wherein said method comprises:

providing a plurality of user interfaces, each said user interface electrically connected to a connector;

activating a user interface at least in part by moving a first user interface relative to a second user interface; and providing illumination only in said first user interface in response to the moving act.

2. A method for activating a user interface of a remote commander as recited in claim 1, wherein providing a plurality of user interfaces comprises connecting said plurality of user interfaces along a common edge.

3. A method for activating a user interface of a remote commander as recited in claim 2, wherein connecting said plurality of user interfaces along a common edge comprises attaching at least one user interface to at least one hinge means.

4. A method for activating a user interface of a remote commander as recited in claim 3, wherein attaching at least one user interface to at least one hinge means comprises providing each said hinge means with at least one said connector.

5. A method for activating a user interface of a remote commander as recited in claim 1, wherein activating said first user interface comprises activating control of said first user interface.

6. A method for activating a user interface of a remote commander as recited in claim 5, wherein activating control and illumination of said first user interface comprises utilizing said connector for each said user interface to activate said first user interface.

7. A method for activating a user interface of a remote commander as recited in claim 6, wherein utilizing said connector for each said user interface to activate said first user interface further comprises utilizing a microprocessor.

8. A method for activating a user interface of a remote commander as recited in claim 7, wherein utilizing a microprocessor comprises utilizing a connector position to determine a user interface position.

9. A remote commander including:
at least first and second user interfaces attached to at least one hinge means; and
a microprocessor in electrical communication with said user interface, said microprocessor configured to activate the first user interface and to illuminate the first user interface, but not the second user interface, when one of the user interfaces is moved relative to the other interface.

10. A remote commander as recited in claim 9 wherein said hinge means comprises a rotatable element, said rotatable element includes a straight segment extending from a connection segment, said first user interface attached to said straight segment.

11. A remote commander as recited in claim 10 further comprising at least one connector, said connector in electrical communication with said first and second user interfaces and said microprocessor.

12. A remote commander as recited in claim 11 wherein said first user interface is in electrical communication with a first connector and said second user interface is in electrical communication with a second connector.

13. A remote commander as recited in claim 12 wherein said first user interface and said first connector are removably connected to said second user interface and said second connector.

14. A method for providing efficient power consumption by activating at least a first user interface of a remote commander having at least first and second user interfaces, wherein said method comprises:
providing electrical connection from at least one connector to each user interface;
enabling movement of the first user interface relative to the second user interface; and
providing efficient power consumption by activating and illuminating only the first user interface in response to the movement between the first and second user interfaces.

15. A method for providing efficient power consumption by activating at least one user interface of a remote commander as recited in claim 14, wherein enabling movement of the first user interface comprises at least one of the group consisting of:
enabling horizontal movement of the first user interface relative to the second user interface;
enabling vertical movement of the first user interface relative to the second user interface;
enabling rotational movement of the first user interface relative to the second user interface; and
enabling detachment of the first user interface from the second user interface.

16. A method for providing efficient power consumption by activating at least one user interface of a remote commander as recited in claim 14, wherein providing efficient power consumption comprises:
utilizing said connector to determine an active user interface; and
providing power only to said active user interface.

17. A method for providing efficient power consumption by activating at least one user interface of a remote commander as recited in claim 16, the remote commander further including a main body, wherein utilizing said connector to determine said active user interface comprises defining said connector connected with the main body as an active connector.

18. A method for providing efficient power consumption by activating at least one user interface of a remote commander as recited in claim 17, wherein said method further comprises:
providing at least one microprocessor; and
utilizing said microprocessor and said active connector to determine said active user interface.

19. A method for providing efficient power consumption by activating at least one user interface of a remote commander as recited in claim 18, wherein utilizing said microprocessor and said active connector to determine said active user interface comprises providing electrical communication between said microprocessor and said active connector of said active user interface.

20. A method for providing efficient power consumption by activating at least one user interface of a remote commander as recited in claim 19, wherein utilizing said microprocessor and said active connector to determine said active user interface further comprises discontinuing electrical communication between said microprocessor and said connector of a non-active user interface.

* * * * *